(12) United States Patent
Kang et al.

(10) Patent No.: US 7,848,335 B1
(45) Date of Patent: Dec. 7, 2010

(54) AUTOMATIC CONNECTED VIRTUAL PRIVATE NETWORK

(75) Inventors: Yong Kang, San Jose, CA (US);
Changming Liu, Cupertino, CA (US);
Yonghui Cheng, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1331 days.

(21) Appl. No.: 11/260,839

(22) Filed: Oct. 27, 2005

(51) Int. Cl.
*H04L 12/28* (2006.01)
(52) U.S. Cl. .................................. 370/401; 370/409
(58) Field of Classification Search ............... 713/153, 713/201
See application file for complete search history.

(56) References Cited

U.S. PATENT DOCUMENTS

| | | | |
|---|---|---|---|
| 6,741,585 B1 * | 5/2004 | Munoz et al. | 370/352 |
| 7,366,894 B1 * | 4/2008 | Kalimuthu et al. | 713/153 |
| 2001/0020273 A1 * | 9/2001 | Murakawa | 713/201 |
| 2003/0214955 A1 * | 11/2003 | Kim | 370/400 |
| 2005/0025069 A1 * | 2/2005 | Aysan | 370/254 |
| 2007/0271451 A1 * | 11/2007 | Fluhrer | 713/150 |

OTHER PUBLICATIONS

Cisco Systems, Dynamic Multipoint VPN Spoke to Spoke Direct Tunneling, Nov. 2004, Entire Document.*
Darren Dukes, Configuration Payload <draft-dukes-ikev2-config-payload-00.txt>, http://tools.ietf.org/draft/draft-dukes-ikev2-config-payload/draft-dukes-ikev2-config-payload-00.txt, pp. 1, 6, and 7.*

* cited by examiner

*Primary Examiner*—Chirag G Shah
*Assistant Examiner*—Otis L Thompson, Jr.
(74) *Attorney, Agent, or Firm*—Shumaker & Sieffert, P.A.

(57) ABSTRACT

A virtual private network (VPN) tunnel is established that extends from a source spoke to a destination spoke in a hub-and-spoke enterprise network. Prior to establishing the VPN tunnel, packets are sent from the source spoke to the destination spoke through the hub network. In this manner, packets are not dropped while the VPN tunnel is being set up. The VPN tunnel is established by querying a server for the network address of a destination router in the destination spoke, then setting up the VPN tunnel using a secure communication protocol. An extension to the Internet Key Exchange (IKE) protocol is used to obtain the private network address of the destination router during setup of the VPN tunnel. A forwarding table is updated after the VPN tunnel is established to reroute the packets through the new VPN tunnel.

24 Claims, 4 Drawing Sheets

AUTOMATIC CONNECTED VIRTUAL PRIVATE NETWORK

TECHNICAL FIELD

Principles of the invention relate to computer networks and, more particularly, to virtual private networks (VPNs) established between computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

A private network may include a number of devices, such as computers, owned or administered by a single enterprise. These devices may be grouped into a number of site networks, which in turn may be geographically distributed over a wide area. Each site network may include one or more local area networks (LANs). With the advent of Virtual Private Network (VPN) technology, enterprises can now securely share data between site networks over a public network, such as the Internet.

A VPN may be configured in a "hub-and-spokes" topology. In a hub-and-spokes network, one site network is the hub, while other site networks are the spokes. This configuration passes all data through the central hub site network; isolating the spoke site networks, and allowing communication between devices within different spoke site networks only through the hub site network. For example, the hub site network may be the network at the headquarters of the enterprise, while the spoke site networks are typically networks at geographically distributed branch offices, sales offices, manufacturing or distribution facilities, or other remote site of the enterprise.

In some instances the remote sites may establish a spoke-to-spoke VPN tunnel to allow computing devices within the remote sites to securely handle time-sensitive communications, such as Voice over Internet Protocol (VoIP) or video conferencing, between the sites through the Internet or another public network infrastructure. A number of communication protocols have been developed for establishing a VPN tunnel. In general, these protocols allow network devices to establish the VPN tunnel as one or more secure data flows across the public network infrastructure. For example, Internet Protocol Security (IPSec) protocols and Secure Sockets Layer (SSL) protocols make use of cryptographic technology to establish network "tunnels." These tunnels allow packets conforming to other network protocols, such as Internet Protocol (IP) packets, to be encapsulated within encrypted packet streams flowing between the sites.

One approach to spoke-to-spoke VPN communications is to maintain a permanent full mesh VPN connection. However, the cost of this approach may be prohibitive. Another option is to establish a spoke-to-spoke VPN tunnel manually whenever a VPN tunnel is needed. However, this option may consume many resources and may induce lengthy delays prior to establishment of the spoke-to-spoke VPN tunnel. An example of automatically setting up a VPN tunnel on demand, known as dynamic VPN, operates by first running a routing protocol, such as Open Shortest Path First (OSPF) or Enhanced Interior Gateway Routing Protocol (EIGRP) on all gateway routers to learn the private IP address of a destination gateway to which an originating gateway is trying to dynamically connect. Routing tables are updated with the VPN route, and packets are sent over this route. Next, the originating gateway queries a Next Hop Resolution Protocol (NHRP) server to obtain the gateway's public IP address using NHRP's private/public IP mapping functionality. Only after the public and private IP addresses are obtained does the originating gateway router use IPSec to set up the VPN tunnel between the spokes. In the meantime, packets are dropped until the VPN tunnel is set up between the spokes, making this method less desirable for time-sensitive communications. Moreover, this method requires three distinct steps, and also requires usage of routing protocols on the gateway routers of the remote sites to learn the private IP addresses.

SUMMARY

In general, principles of the invention relate to techniques for automatically connecting a spoke-to-spoke Virtual Private Network (VPN) tunnel using a secure communication protocol such as the Internet Protocol Security (IPSec) protocol. In particular, techniques are described for establishing a spoke-to-spoke VPN tunnel without requiring usage of a routing protocol at a spoke site to learn the private IP address of a gateway router associated with another spoke site. These techniques may provide better scalability. In the case of a large enterprise, the feature of not requiring usage of a routing protocol at the spoke sites may simplify network maintenance.

A source personal computer (PC) in a source spoke network begins transmission of time-sensitive communication packets to a destination PC in a destination spoke network of a hub-and-spoke VPN. A source gateway router at the edge of the source spoke network receives the packets and initiates automatic setup of a spoke-to-spoke VPN tunnel for transmitting the packets to the destination spoke network. As described herein, the source gateway router queries a server, such as a Next Hop Resolution Protocol (NHRP) server, for a public IP address of the destination gateway router. Before the source gateway router has completed establishing the spoke-to-spoke VPN tunnel, the source gateway router sends traffic through pre-existing default routes through the hub network. As a result, packets are not dropped while the spoke-to-spoke VPN tunnel is being established. The source gateway router thereafter establishes the spoke-to-spoke VPN tunnel using the IPSec protocol. Upon establishing the spoke-to-spoke VPN tunnel, the source gateway router injects the corresponding route between the spokes by updating its forwarding table, thereby causing the traffic to be automatically rerouted through the VPN tunnel established between the spokes.

In one embodiment, a method comprises obtaining a public network address associated with a destination spoke network of a virtual private network (VPN), establishing a VPN tunnel between a source spoke network of the VPN and the destination spoke network, determining a private network address associated with the destination spoke network of the VPN while establishing the VPN tunnel, and after establishing the VPN tunnel, updating a forwarding table to forward packets between the source spoke network and the destination spoke network.

In another embodiment, a device comprises a control unit that obtains a public network address associated with a destination spoke network of a virtual private network (VPN) and establishes a VPN tunnel between a source spoke network of the VPN and the destination spoke network, a forwarding table maintained by the control unit, and a secure communication protocol executed by the control unit that establishes a VPN tunnel to the destination spoke network, wherein the control unit determines a private network address associated with the destination spoke network of the VPN when establishing the VPN tunnel with the secure communication protocol.

In another embodiment, a system comprises a source spoke network of a virtual private network (VPN) and a destination spoke network of the VPN, wherein the source spoke network includes a source router that automatically establishes a spoke-to-spoke VPN tunnel between the source spoke network and the destination spoke network by using a security protocol to learn a private network address of a gateway associated with the destination spoke network.

In a further embodiment, a computer-readable medium comprises instructions for causing a device to obtain a public network address associated with a destination spoke network of a virtual private network (VPN), establish a VPN tunnel between a source spoke network of the VPN and the destination spoke network, determine a private network address associated with the destination spoke network of the VPN while establishing the VPN tunnel, and after establishing the VPN tunnel, update a forwarding table to forward packets between the source spoke network and the destination spoke network.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
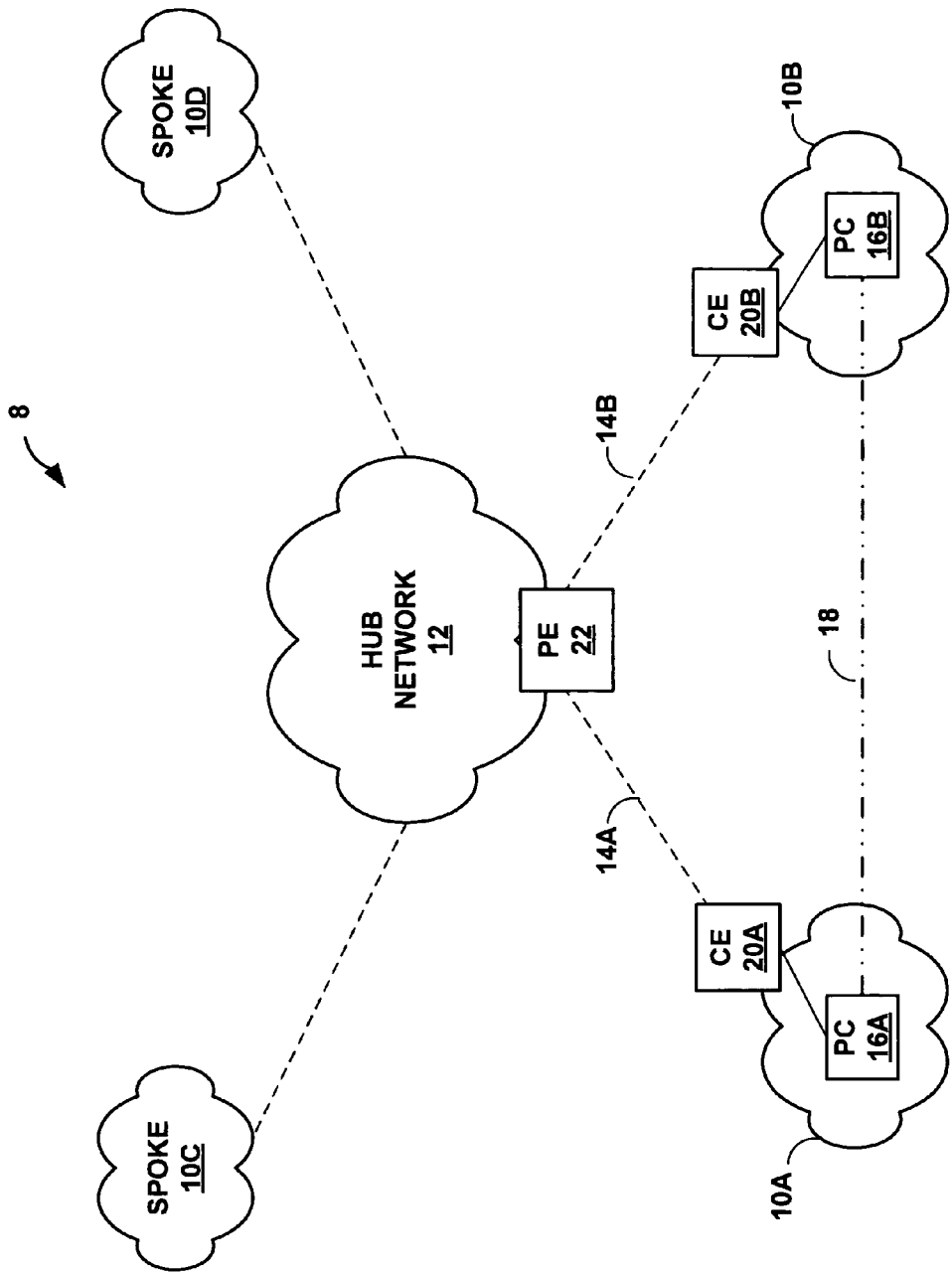
FIG. 1 is a block diagram illustrating an example network environment in which spoke-to-spoke virtual private network (VPN) tunnels are automatically established consistent with the principles of the invention.

FIG. 1 is a block diagram illustrating an example enterprise network environment 8 in which customer edge (CE) routers 20A-20B (collectively, "CE routers 20") automatically establish spoke-to-spoke virtual private network (VPN) tunnels in accordance with the principles of the invention. In the illustrated example of FIG. 1, enterprise network environment 8 is a large enterprise network comprising hub network 12 and spoke networks 10A-10D (collectively, "spoke networks 10"). For example, spoke networks 10 may be networks for enterprise branch offices located in geographically separated sites. Although illustrated for ease of description with one hub network 12 and four spoke networks 10, enterprise network environment 8 may have a plurality of hub networks 12 and spoke networks 10.

In the example of FIG. 1, provider edge router 22 is an edge router of hub network 12, and provides connectivity for spoke networks 10A and 10B. In particular, provider edge router 22 is logically coupled to customer edge routers 20A and 20B via hub-to-spoke VPN tunnels 14A and 14B, respectively.

Although not shown, hub network 12 and spoke networks 10 may be separate by one or more public networks, such as the Internet. For example, hub network 12 may be coupled to one or more networks administered by other providers, and may thus form part of a large-scale public network infrastructure, e.g., the Internet. Similarly, spoke networks 10 may be viewed as edge networks of the Internet. The enterprise may provide computing devices within spoke networks 10 with access to the Internet via customer edge routers, and may allow computing devices within one of spoke networks 10 to communicate with computing devices in the other of spoke networks 10 over the Internet. Hub network 12 may include a variety of network devices, such as routers, switches, or servers.

Similarly, each of spoke networks 10 may include one or more computing devices, such as personal computers, laptop computers, handheld computers, workstations, servers, switches, or printers. For example, spoke networks 10A and 10B contain personal computers (PCs) 16A and 16B (collectively "PCs 16"). A personal computer, such as PC 16A of spoke network 10A, may initiate transmission of time-sensitive communications to a personal computer located in a different spoke network, such as PC 16B of spoke network 10B. For example, PC 16A may want to do Voice over Internet Protocol (VoIP) or video conferencing with PC 16B. To provide secure communication, CE router 20A may automatically set up a spoke-to-spoke VPN tunnel 18 between spoke network 10A and spoke network 10B. In many cases, CE router 20A may elect to use a route for spoke-to-spoke VPN tunnel 18 that does not go through hub network 12.

As will be described in further detail below, in response to time-sensitive communications or other traffic, CE router 20A may set up spoke-to-spoke VPN tunnel 18 by exchanging a public and a private network address (e.g., IP address) of spoke 10B via the hub. To obtain the public IP address of a gateway router for the destination PC 16B, e.g., CE router 20B, CE router 20A queries a Next Hop Resolution Protocol (NHRP) server (not shown) for the public IP address of CE router 20B. The NHRP server may be located at any point along the route to PC 16B through hub network 12. For example, the NHRP server may be located on PE router 22. As another example, the NHRP server may be located on CE router 20B.

Before spoke-to-spoke VPN tunnel 18 is established, traffic CE router 20A sends the time-sensitive traffic to spoke 10B through default routes through hub network 12, i.e., via VPN tunnels 14. As a result, packets associated with the time-sensitive traffic are not dropped while spoke-to-spoke VPN tunnel 18 is being established while the private and public IP addresses of a gateway router for PC 16B are learned. CE router 20A thereafter establishes spoke-to-spoke VPN tunnel 18 using a secure communication protocol such as the Internet Protocol Security (IPSec) protocol. Upon establishing spoke-to-spoke VPN tunnel 18, CE router 20A updates a forwarding table to inject a corresponding route between spoke networks 10A and 10B, thereby causing traffic to be automatically rerouted through VPN tunnel 18 established between the spoke networks. As a result, CE router 20A may automatically setup spoke-to-spoke VPN tunnel 18 with only two steps: (1) querying an NHRP server for a gateway router's public IP address and (2) establishing the VPN tunnel using IPSec or some other secure protocol. In this manner, time-sensitive communications may be securely transferred from PC 16A to PC 16B.

A remote client, e.g., a human administrator or an automated script, may access customer edge routers 20 to set policy data to selectively indicate what types of network traffic should trigger establishment of a spoke-to-spoke VPN tunnel 18. As a result, customer edge routers 20 may easily initiate setup of spoke-to-spoke VPNs. In this manner, the techniques may reduce or eliminate the need for administrators to manually configure customer edge routers 20 in order to achieve communications through spoke-to-spoke VPN tunnels. As a result, the techniques may avoid significant administrative resources that otherwise would be necessary to manually initiate setup of spoke-to-spoke VPNs on demand.

Figure 2:
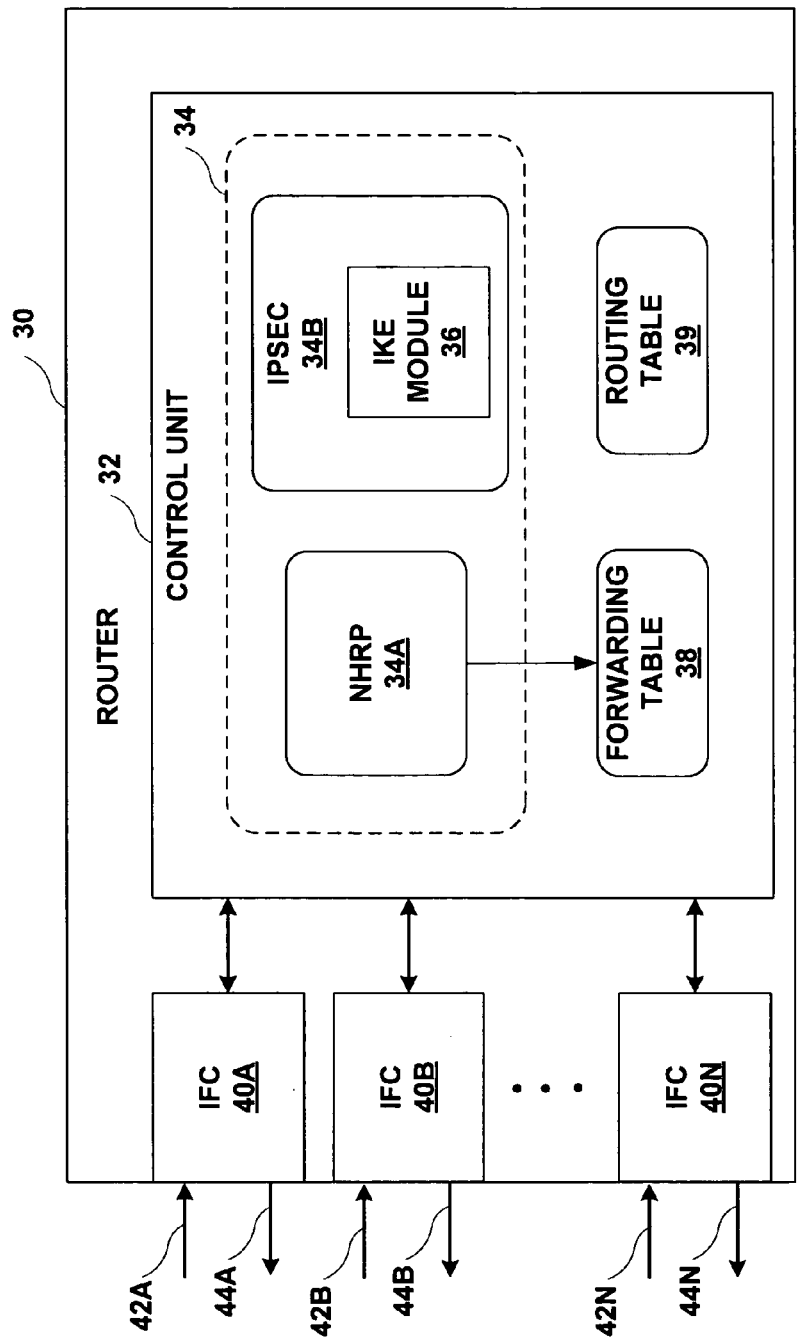
FIG. 2 is a block diagram illustrating an exemplary embodiment of a router that automatically establishes spoke-to-spoke VPN tunnels in accordance with the principles of the invention.

FIG. 2 is a block diagram illustrating an exemplary embodiment of a router 30 that automatically establishes spoke-to-spoke VPN tunnels in accordance with the principles of the invention. Router 30 may be a gateway router, such as CE router 20A of FIG. 1.

In the example embodiment of FIG. 2, router 30 includes a set of interface cards (IFCs) 40A-40N (collectively, "IFCs 40") for communicating packets via inbound links 42A-42N (collectively, "inbound links 42") and outbound links 44A-44N (collectively, "outbound links 44"). Router 30 further comprises a control unit 32 that maintains forwarding table 38 and routing table 39.

Routing table 39 describes the topology of a network, such as enterprise network environment 8 of FIG. 1, and, in particular, routes through the network. Routing table 39 may include, for example, route data that describes various routes within a network, as well as labels that will be applied to the traffic. Router 30 receives routing communications from other routers, and updates routing table 39 to accurately reflect the topology of the network in accordance with the routing communications.

Router 30 generates forwarding table 38 based upon the routes stored within routing table 39. Upon updating routing table 39, control unit 32 regenerates forwarding table to associated destinations with specific next hops and outbound links 44. Control unit 32 may maintain forwarding table 38 and routing table 39 in the form of one or more tables, databases, link lists, radix trees, databases, flat files, or any other data structures.

In general, when router 30 receives a packet via one of inbound links 42, control unit 32 determines a destination and an associated next hop for the packet in accordance with forwarding table 38 and routing table 39. Router 30 then forwards the packet on one of outbound links 44 based on the selected next hop. In particular, control unit 32 determines a next hop for each inbound packet based on forwarding information 38, identifies a corresponding IFC 40 associated with the next hop, and relays the packet to the appropriate IFC 40.

Control unit 32 provides an operating environment for protocols 34A-34B (collectively, "protocols 34") executing within control unit 32. In this example, protocols 34 include a Next Hop Resolution Protocol 34A ("NHRP 34A") and an Internet Protocol Security protocol 34B ("IPSec 34B"). In general, NHRP 34A is used to resolve next hops to public IP addresses by querying an NHRP server. When establishing VPN tunnel 18, NHRP 34A is used to identify and query an NHRP server to obtain a public network address for a gateway router associated with network spoke 10B. In the example of FIG. 1, NHRP 34A identifies then queries the NHRP server for the public network address (e.g., IP address) of CE router 20B.

IPSec 34B is an exemplary tunneling protocol that may provide router 30 with authentication of remote systems and establishment of secure communications with the systems. For example, IPSec 34B may provide end-to-end security between router 30 and a gateway router. In the exemplary embodiment of FIG. 2, IPSec 34B includes an Internet Key Exchange (IKE) module 36. Control unit 32 may utilize IKE module 36 to negotiate and establish an IPSec tunnel. In particular, control unit 42 may invoke IKE module 36 to exchange cryptographic keys and other session information with the other network device. IKE module 36 may automatically negotiate security associations to secure packets transmitted from router 30 to another network.

IKE module 36 may be an extended version of the conventional IKE protocol that additionally exchanges private IP addresses of gateway routers at the time of the key exchange. Thus, a routing protocol is not required to obtain the private IP address of the gateway router prior to setting up a spoke-to-spoke VPN, and the usage of the routing protocol may be eliminated. As a result, the automatic setup of a spoke-to-spoke VPN tunnel (e.g., spoke-to-spoke VPN tunnel of FIG. 1) may proceed with only two steps: querying an NHRP server for a gateway router's public IP address, and establishing the VPN tunnel using IPSec 34B. During this last step, the private address of the gateway router for the destination network spoke may be automatically determined due to the extended IKE module 36, and this private address may be used for updating routing table 39 and forwarding table 38 to redirect traffic through the spoke-to-spoke VPN tunnel. Although described for exemplary purposes in reference to IPSec, the principles described herein may by applied to extend any secure communication protocol that may be used to establish secure tunnels.

The architecture of router 30 illustrated in FIG. 2 is for exemplary purposes only, and the principles of the invention are not limited to this architecture. Control unit 32 may operate according to executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like. The functions of router 30 may be implemented by executing the instructions of the computer-readable medium with one or more processors, discrete hardware circuitry, firmware, software executing on a programmable processor, or a combination of any of the above.

In addition, the forwarding functionality described with respect to control unit 32 may be distributed between control unit 32 and IFCs 40. In such an embodiment, any combination of control unit 32 and one of more of IFCs 40 may automatically establish a spoke-to-spoke VPN tunnel in accordance with the principles of the invention described herein.

Figure 3:
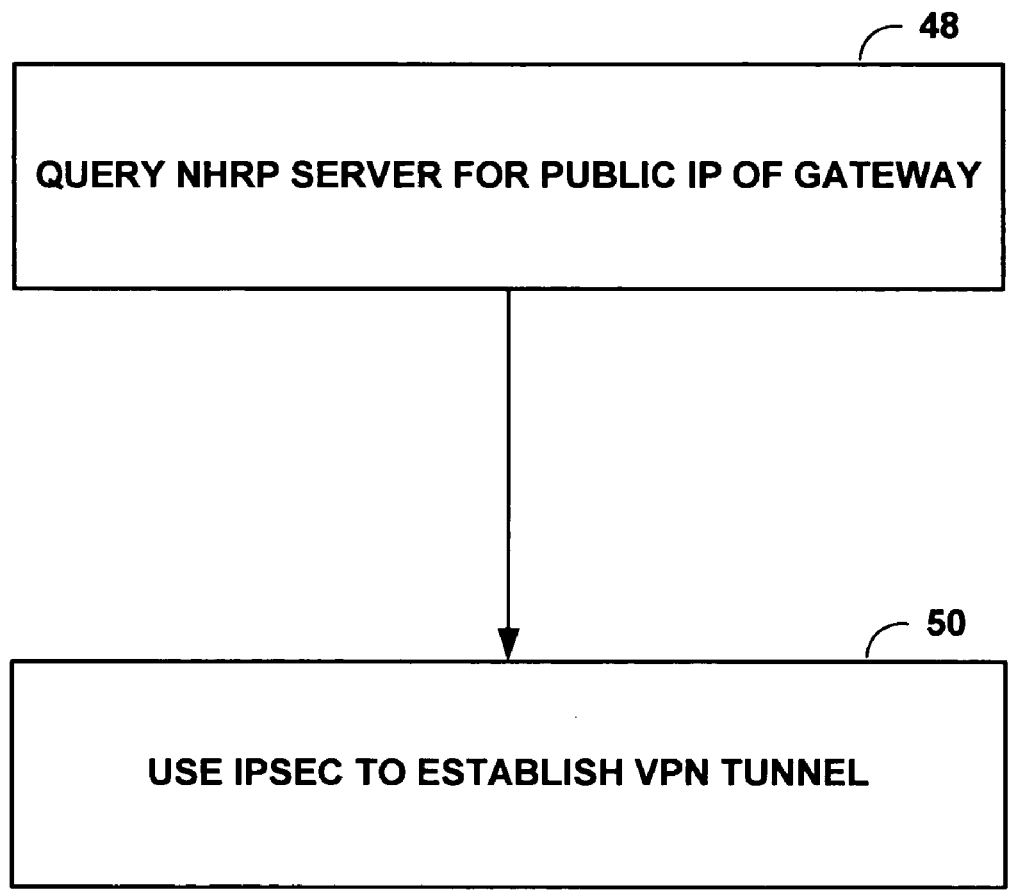
FIG. 3 is a flow diagram illustrating exemplary operation of the router in accordance with the principles of the invention.

FIG. 3 is a flow diagram illustrating exemplary operation of the router in accordance with the principles of the invention. For exemplary purposes, the flow diagram of FIG. 3 will be explained in reference to FIG. 1 and, in particular, customer edge routers 20. FIG. 3 illustrates how automated establishment of a spoke-to-spoke VPN tunnel may be accomplished in two substantive steps.

Suppose PC 16A in spoke network 10A wants to securely send time-sensitive traffic to PC 16B located in spoke network 10B. CE router 20A can accomplish this by setting up a spoke-to-spoke VPN tunnel 18. Upon receiving time-sensitive traffic (or before receiving the traffic but in response to another event), CE router 20A automatically sets up spoke-to-spoke VPN tunnel 18 using two main steps. First, CE router 20A queries an NHRP server, asking for the public IP address of the gateway router that CE router 20A associated with PC 16B (48). In this case, that gateway router is CE router 20B, and the NHRP server responds with the public IP address of CE router 20B.

With this information, CE router 20A is set to use IPSec or some other security protocol to establish the VPN tunnel 18 (50). CE router 20A need not first determine the private IP address of CE router 20B, since this information will become available while IPSec is establishing VPN tunnel 18. In particular, the IKE protocol, which runs as part of the IPSec protocol, has been extended to exchange the private IP addresses for the gateway routers while it exchanges security keys for use in encrypting and decrypting packets. Thus, CE router 20A need not run a routing protocol or otherwise perform an additional step to obtain the gateway's private IP address before establishing VPN tunnel 18.

Figure 4:
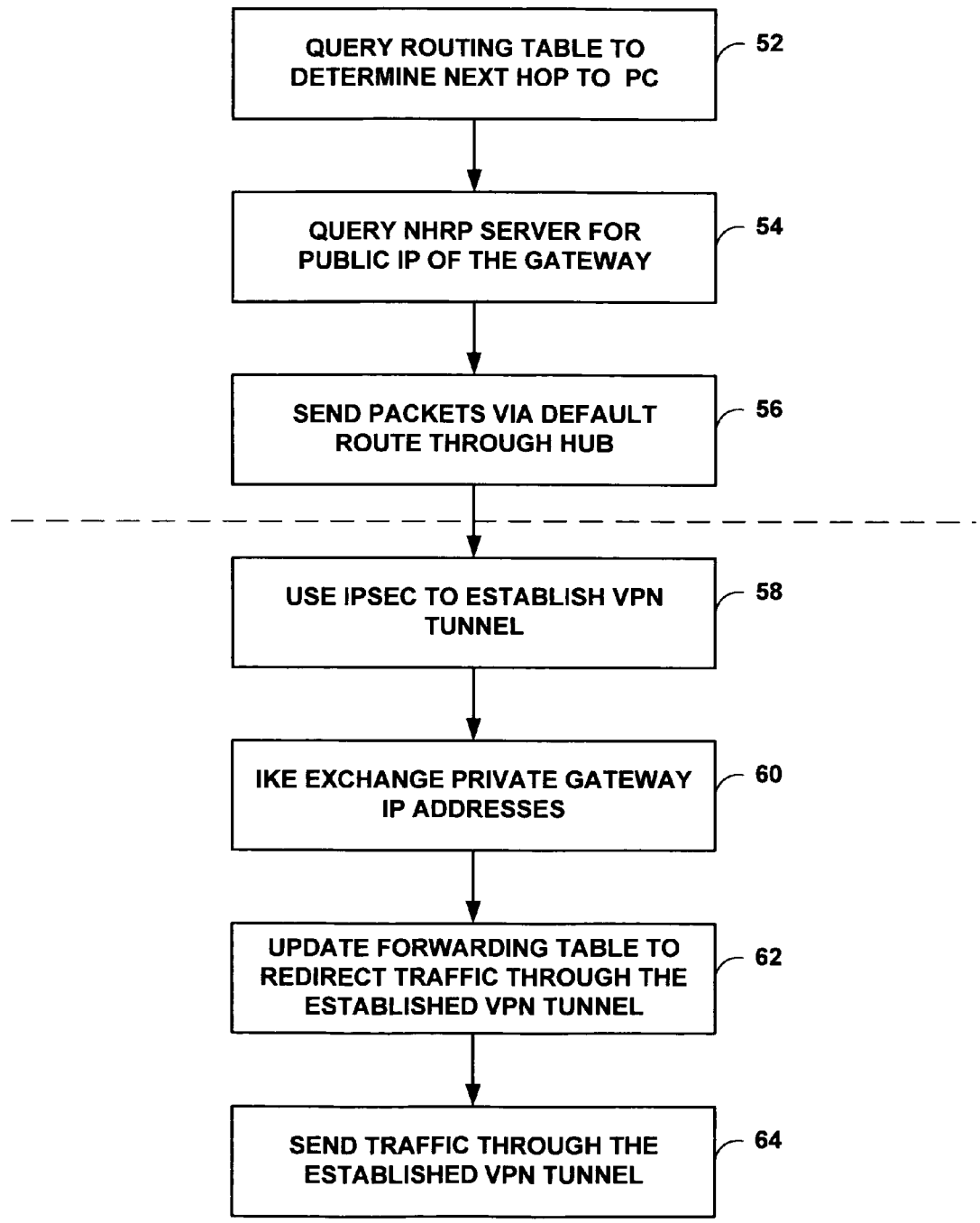
FIG. 4 is a flow diagram illustrating exemplary operation of the router in further detail.

FIG. 4 is a flow diagram illustrating exemplary operation of the router in further detail in accordance with the principles of the invention. In particular, FIG. 4 illustrates in further detail operation of the router when performing the two substantive steps set forth in FIG. 3. In general, steps 52-56 correspond to step 48 of FIG. 3, while steps 58-64 correspond to step 50. For exemplary purposes, the flow diagram of FIG. 4 will be explained in reference to FIG. 1 and, in particular, customer edge routers 20.

Suppose PC 16A in spoke network 10A wants to securely send time-sensitive traffic to PC 16B located in spoke network 10B. CE router 20A will do this by setting up a spoke-to-spoke VPN tunnel 18. To set up the spoke-to-spoke VPN tunnel 18, CE router 20A needs to know the public IP address of CE router 20B. CE router 20A will send out an NHRP query to ask for the public IP address of CE router 20B. To do this, however, CE router 20A must first determine where the NHRP query should be sent. Initially, CE router 20A queries its own routing table to determine a next hop associated with PC 16B (52). In particular, CE router 20A looks up the IP address of PC 16B in its routing table to identify a next hop associated with routes to PC 16B. In the case of FIG. 1, CE router 20A determines that PC 16B lies behind provider edge (PE) router 22. CE router 20A issues an NHRP query for the NHRP server to PE router 22, in order to obtain the public IP address of CE router 20B (54).

When PE router 22 receives the NHRP query, if PE router 22 does not know the public IP address of CE router 20B, PE router 22 will similarly do a look-up in the routing table of PE router 22, and will forward the NHRP query to the next hop on the route to PC 16B. In FIG. 1, the next hop is CE router 20B. Thus, PE router 22 forwards the NHRP query to CE router 20B. CE router 20B receives the NHRP query, and knows that PC 16B is located behind CE router 20B. CE router 20B sends its own public IP address to CE router 20A. In this manner, CE router 20A obtains the public IP address of CE router 20B, to be used in setting up VPN tunnel 18. This method makes use of the fact that the NHRP query will follow the route path and eventually reach the serving gateway router of the traffic destination.

While CE router 20A is performing the steps above, CE router 20A also sends the traffic from PC 16A to PC 16B through a default route through the hub via VPN tunnels 14A and 14B (56). This route may be less direct and, consequently, slower than VPN tunnel 18 will be when the VPN tunnel is established, but usage of the default route will ensure that packets are not dropped while VPN tunnel 18 is being established. CE router 20A continues to send the packets through the hub network until after the private IP address is determined and VPN tunnel 18 is ultimately established.

Once CE router 20A has received the public IP address of CE router 20B, CE router 20A uses IPSec or some other security protocol to establish spoke-to-spoke VPN tunnel 18 from spoke network 10A to spoke network 10B (58). While VPN tunnel 18 is being established, IKE module 36 (FIG. 2) of IPSec protocol 34B exchanges keys for encryption and decryption. In addition, the extend version of IKE module 36 also exchanges the private IP addresses for the gateways of the spoke networks 10A and 10B (60). In this manner, CE router 20A obtains the private IP address for CE router 20B without performing additional steps or usage of additional protocols.

After the private IP address is learned and VPN tunnel 18 is established, CE router 20A updates forwarding table 38 to redirect the traffic through VPN tunnel 18 (62). CE router 20A then sends the traffic to CE router 20B via the established VPN tunnel 18 (64). In this manner, time-sensitive communications may be securely transferred from PC 16A to PC 16B. Moreover, setup of VPN tunnel 18 can be completed without use of a routing protocol for determining the private IP address of CE router 20B. Further, packets are not lost during the process because the forwarding table is updated to reflect the VPN route only after VPN tunnel 18 is actually established and able to carry traffic.

Various embodiments of the invention have been described. These and other embodiments are within the scope of the following claims.

The invention claimed is:

1. A method comprising:
   obtaining a public network address of a gateway router positioned within a destination spoke network of a virtual private network (VPN);
   establishing a VPN tunnel between a source spoke network of the VPN and the destination spoke network;
   while establishing the VPN tunnel, learning at the source spoke network a private network address assigned to the gateway router positioned within the destination spoke network of the VPN; and
   after establishing the VPN tunnel, updating a forwarding table to install a route that specifies the private network address assigned to the gateway router to forward packets between the source spoke network and the destination spoke network.

2. The method of claim 1, wherein obtaining the public network address comprises issuing a query from a source router of the source spoke network to a server to obtain the public network address of the gateway router of the destination spoke network.

3. The method of claim 2, wherein issuing the query comprises issuing a query to a Next Hop Resolution Protocol (NHRP) server.

4. The method of claim 2, further comprising querying a routing table with a network address of a destination device associated with the destination spoke network to identify a next hop router associated with the destination device.

5. The method of claim 4, further comprising issuing the query to the server along a route associated with the destination device.

6. The method of claim 1, further comprising sending packets through a hub network prior to establishing the VPN tunnel.

7. The method of claim 1,
   wherein establishing the VPN comprises establishing a secure connection using a secure communication protocol; and
   wherein determining a private network address comprises using a key exchange protocol to learn the private network address.

8. The method of claim 7, wherein using a key exchange protocol comprises using an Internet Key Exchange (IKE) protocol to obtain a private network address associated with the destination spoke network.

9. The method of claim 7, wherein the secure communication protocol is the Internet Protocol Security (IPSec) protocol.

10. The method of claim 1, further comprising:
identifying a packet as a time-sensitive packet; and
initiating automatic setup of the VPN tunnel in response to the time-sensitive packet.

11. The method of claim 1, further comprising:
before completing establishment of the VPN tunnel, forwarding packets from the source spoke network to the destination spoke network through default routes through a hub network of the VPN;
wherein after establishing the tunnel, updating a forwarding table to forward packets between the source spoke network and the destination spoke network comprises updating the forwarding table to install the route that specifies the private network address assigned to the gateway router to forward packets directly between the source spoke network and the destination spoke network without passing through the hub network.

12. A device comprising:
a control unit that obtains a public network address of a gateway router positioned within a destination spoke network of a virtual private network (VPN) and establishes a VPN tunnel between a source spoke network of the VPN and the destination spoke network;
a forwarding table maintained by the control unit; and
a secure communication protocol executed by the control unit that establishes a VPN tunnel to the destination spoke network prior to updating the forwarding table to forward packets between the source spoke network and the destination spoke network,
wherein the control unit learns a private network address assigned to the gateway router positioned within the destination spoke network of the VPN while establishing the VPN tunnel with the secure communication protocol, and
wherein the control unit updates the forwarding table to install a route that specifies the private network address assigned to the gateway router of the destination spoke network to forward packets between the source spoke network and the destination spoke network.

13. The device of claim 12, wherein the control unit issues a query from a source router of the source spoke network to a server to obtain the public network address of the gateway router of the destination spoke network.

14. The device of claim 13, wherein the server comprises a Next Hop Resolution Protocol (NHRP) server.

15. The device of claim 13, wherein the control unit queries a routing table with the public network address of a destination device associated with the destination spoke network to identify a next hop router associated with the destination device.

16. The device of claim 15, wherein the control unit issues the query to the server along a route associated with the destination device.

17. The device of claim 12, wherein the control unit sends packets through a hub network prior to the secure communication protocol establishing the VPN tunnel.

18. The device of claim 12, wherein the secure communication protocol establishes a secure connection and uses an Internet Key Exchange (IKE) protocol to obtain a private network address associated with the destination spoke network.

19. The device of claim 18, wherein the secure communication protocol is the Internet Protocol Security (IPSec) protocol.

20. The device of claim 12, wherein the control unit is configured to automatically set up the VPN tunnel when the device receives a type of packet.

21. A system comprising:
a source spoke network of a virtual private network (VPN); and
a destination spoke network of the VPN,
wherein the source spoke network includes a source router that automatically establishes a spoke-to-spoke VPN tunnel between the source spoke network and the destination spoke network by using a security protocol to learn a private network address of a gateway associated with the destination spoke network while establishing the VPN tunnel,
wherein only after establishing the VPN tunnel, the source router updates a forwarding table to install a route that specifies the private network address assigned to the gateway of the destination spoke network to forward packets between the source spoke network and the destination spoke network.

22. The system of claim 21, wherein the source router sends packets through a hub network prior to establishing the VPN tunnel.

23. The system of claim 21, wherein the source router establishes a secure connection using a secure communication protocol and uses an Internet Key Exchange (IKE) protocol to exchange the private network address of the gateway associated with the destination spoke network.

24. A non-transitory computer-readable medium comprising instructions for causing a device to:
obtain a public network address of a gateway router positioned within a destination spoke network of a virtual private network (VPN);
establish a VPN tunnel between a source spoke network of the VPN and the destination spoke network;
learn a private network address assigned to the gateway router positioned within the destination spoke network of the VPN while establishing the VPN tunnel; and
after establishing the VPN tunnel, update a forwarding table to install a route that specifies the private network address assigned to the gateway router to forward packets between the source spoke network and the destination spoke network.

\* \* \* \* \*